(12) United States Patent
Shima et al.

(10) Patent No.: US 6,411,466 B1
(45) Date of Patent: Jun. 25, 2002

(54) TAPE CARTRIDGE

(75) Inventors: Motohiko Shima; Hiroshi Kaneda; Masatoshi Okamura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/574,363

(22) Filed: May 19, 2000

(30) Foreign Application Priority Data

May 25, 1999 (JP) ........................................... 11-144623
Aug. 9, 1999 (JP) ........................................... 11-225089

(51) Int. Cl.$^7$ ........................................... G11B 23/107
(52) U.S. Cl. ..................... 360/132; 242/348; 242/343.2
(58) Field of Search ..................... 360/132; 242/338.1, 242/338.2, 343, 343.1, 343.2, 348, 348.3, 345, 345.2, 611

(56) References Cited

U.S. PATENT DOCUMENTS

| | | | | | |
|---|---|---|---|---|---|
| 4,555,077 | A | * | 11/1985 | Platter et al. | 242/338.1 |
| 5,027,249 | A | * | 6/1991 | Johnson et al. | 242/345.2 |
| 5,366,173 | A | * | 11/1994 | Lammers et al. | 242/338.1 |
| 5,893,527 | A | * | 4/1999 | Mizutani et al. | 242/348 |
| 5,901,916 | A | * | 5/1999 | MsAllister et al. | 242/348 |
| 6,038,112 | A | * | 3/2000 | Kletzl | 360/132 |
| 6,147,962 | A | * | 11/2000 | Srinivasan et al. | 369/291 |
| 6,154,342 | A | * | 11/2000 | Vanderheyden et al. | 360/132 |
| 6,273,352 | B1 | * | 8/2001 | Johnson et al. | 242/340 |

FOREIGN PATENT DOCUMENTS

| | | |
|---|---|---|
| EP | 0 284 687 A2 | 10/1988 |
| EP | 0 284 687 | 10/1988 |
| EP | 0 510 793 A1 | 10/1992 |
| EP | 0 926 676 A1 | 6/1999 |
| JP | 63-251983 | 10/1988 |

OTHER PUBLICATIONS

European Search Report for European Application No. 00110844.8 dated Nov. 22, 2000.

\* cited by examiner

*Primary Examiner*—David L. Ometz
(74) *Attorney, Agent, or Firm*—Marshall, Gerstein & Borun (57) ABSTRACT

In a tape cartridge which turnably holds within a housing a single tape reel on which a length of tape is wound, the tape reel consisting of an upper flange, a lower flange, and a hub which is open at top and is closed at the bottom, the hub having a metal disk in the center of the outer bottom surface and teeth formed around the outer periphery of the metal disk for engagement with a drive shaft of a recorder, the underside of the hub having throughholes for engagement with a brake release plate, the hub having teeth formed on the inner bottom surface to engage a brake lock, the brake release plate consisting of a main plate disposed between the brake lock and the inner surface of the hub and a plurality of legs adapted to fit in the throughholes in the bottom of the hub, the brake lock having brake teeth formed on the periphery of its underside and a contact area in the center for engagement with the brake release plate, the teeth of the hub and the brake teeth of the brake lock being in mesh to prevent unwanted turning of the tape reel, and further including a spring member provided between the brake lock and an upper casing of the housing to urge the brake lock in the braking position:

the invention forms a short toe on the outer end of each leg of the brake release plate so as to prevent the leg from coming off, out of engagement with, a corresponding hole of the hub; provides a reinforcing structure between the center of main plate and the legs of the brake release plate; precludes the possibility of a once-incorporated brake release plate coming off from the hub during the course of assembling; and ensures positive release action of the brake release plate.

4 Claims, 12 Drawing Sheets

TAPE CARTRIDGE

BACKGROUND OF THE INVENTION

1. Field of the Invention

This invention relates to a single-reel type tape cartridge for use with magnetic recording-reproducing apparatus (hereinafter called a "recorder").

1. Prior Art

Japanese Patent Application Kokai No. 63-251983 discloses a single-reel type tape cartridge having a brake lock which applies the brake on the tape reel and releases it by upward and downward motion within a hub on which the tape is wound.

Figure 6:
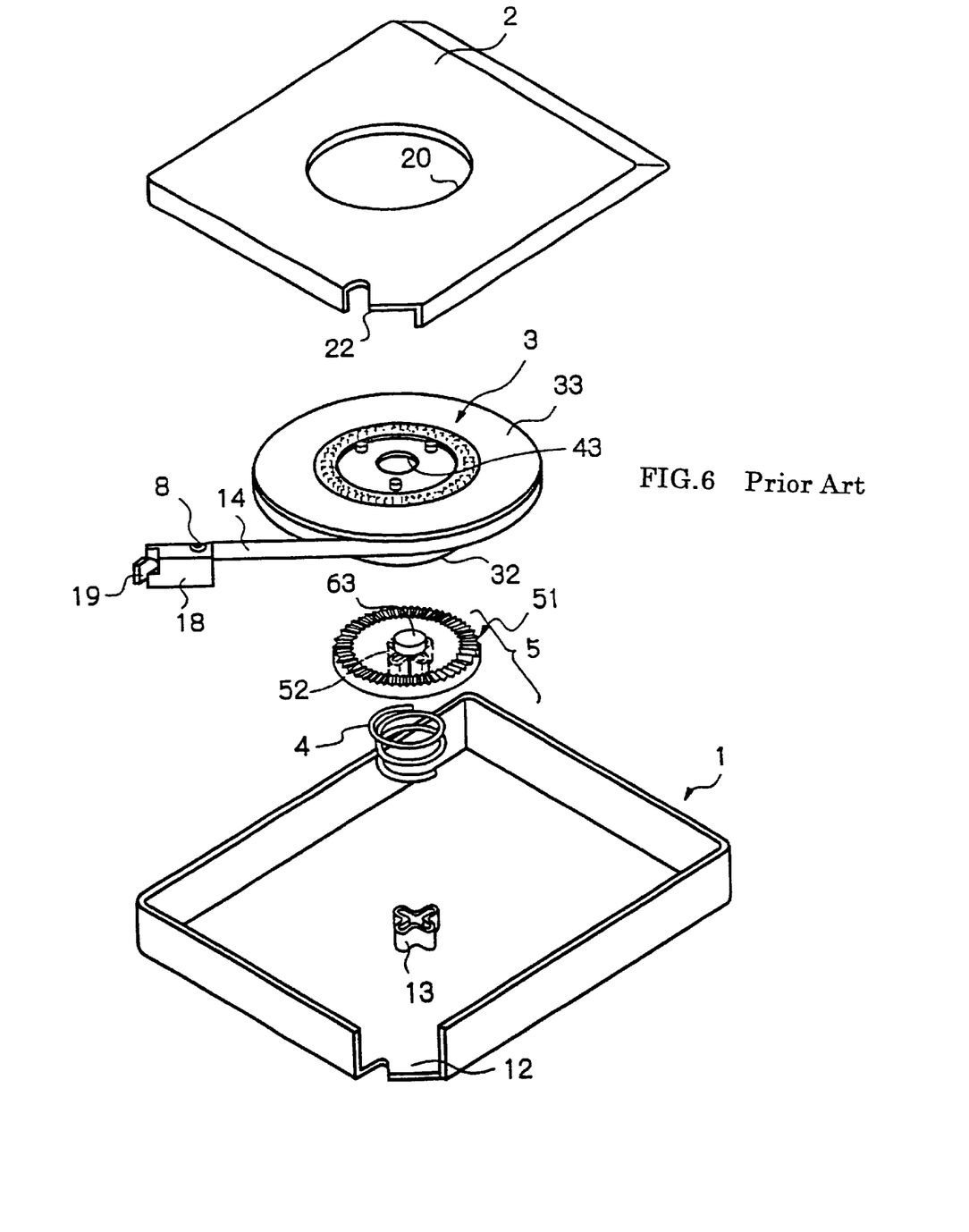
FIG. 6 is an exploded view of a conventional tape cartridge.
Figure 7:
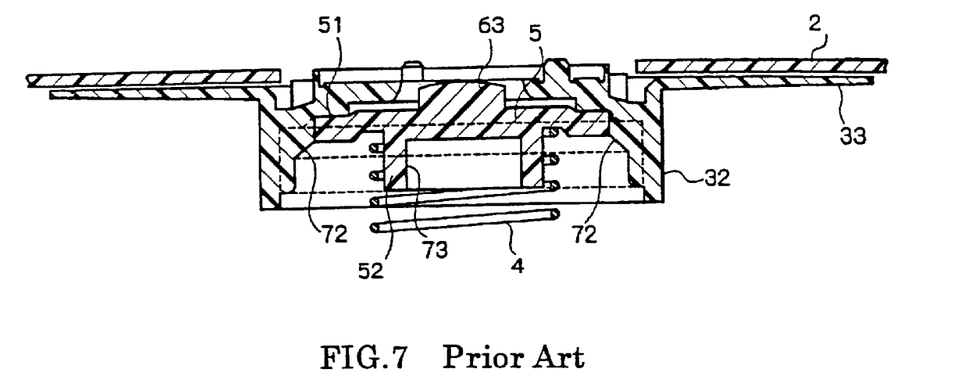
FIG. 7 is a fragmentary sectional view of the conventional cartridge.

FIG. 6 is an exploded view of a single-reel type cartridge of the prior art. FIG. 7 is a cross sectional view showing essential parts of the cartridge. For easier reference the components are shown upside down. The cartridge comprises a housing composed of an upper casing 1 and a lower casing 2, and a single tape reel 3 on which a length of tape 14 is wound and which is turnably held within the housing.

Upper and lower casings 1, 2 are formed, respectively, with cutouts 12, 22 which are joined to provide an opening into which a leader block 18 is inserted so as to be drawn out by a drive member of a recorder.

Tape reel 3 consists integrally of a hub 32 formed in one piece with a lower flange 33. It is driven for rotation by a drive of a recorder that is inserted into the opening 20 of lower casing 2.

Hub 32 has a tooth-like part formed on its inner surface to be in mesh with a brake lock 5 so as to prevent unwanted turning of tape reel 3 when the latter is not in use.

Brake lock 5 has teeth 51 formed on its underside in mesh with the corresponding part of hub 32. Brake lock 5 is normally urged in the braking position by a brake spring 4.

A follower projection 52 of brake lock 5 has a recess 73 which slidably engages with a guide 13 formed on the inner surface of upper casing 1, allowing brake lock 5 to move up and down positively between a lower braking position and an upper brake release position.

A brake release projection 63 formed on the underside of brake lock 5 fits in a center hole 43 at the bottom of hub 32, and as soon as the cartridge is loaded in a recorder, brake release projection 63 is lifted with an attendant upward movement of brake lock 5 out of engagement with tape reel 3, setting the reel free to turn.

The beginning of tape 14 is wound round a pin member 8, which in turn is fixedly fitted in a pin-receiving groove of a leader block 18. When the cartridge is loaded in a recorder, leader block 18 is caught by a draw-out member that comes out of the recorder into an engaging recess 19 of the block. It is then drawn out, led along the tape path inside the recorder up to a take-up reel, and is eventually held within a recess formed in the periphery of the recorder's take-up reel.

In the cartridge of the prior art, the brake on the hub is released as brake lock 5 is lifted with its brake release projection 63 pressed by a brake release member of a recorder. When the center of either projection 63 or the brake release member of a recorder is off the center of the other (a situation that can result from dimensional errors of the products), smooth release of the brake is sometimes impossible because the brake lock fails to move straightly upward or because the outer periphery of brake lock 5 catches a sloped rib 72 (FIG. 7) that aligns brake lock 5 to hub 32.

It might seem possible then to accomplish positive release of the brake by the interposition of a brake release plate between the brake release member of a recorder and brake lock 5 on the part of the cartridge. In that case the brake release plate would be deflected along its periphery because the latter is pushed upward while the center of the plate remains in contact with the brake button, leading to failure in positive release of the brake.

The present invention, therefore, aims at providing a brake plate structure capable of ensuring positive release of the brake plate.

The tape cartridge of the prior art prevents unwanted turning of the reel when the cartridge is not in use by pressing brake lock 5 downward by reel spring 4 and thereby keeping teeth of the reel in mesh with teeth 51 of the brake lock.

The brake lock mechanism for use in a tape cartridge of the character according to the invention, as will be explained later, includes a brake release plate having three legs and interposed between a reel hub and a brake lock, while the brake lock is urged downward by a spring member so that teeth of the reel and teeth of the brake lock are in mesh. When the tape cartridge is set in a recorder, drive means of the recorder engages the legs of the brake release plate and lowers the plate to a predetermined point where the teeth of the reel and brake lock are disengaged, whereby the reel is set free to turn and the tape is drawn out of the cartridge. At the time of cartridge assembling, three "spider" legs of the brake release plate, inserted in advance in three corresponding holes formed in the reel hub, can sometimes come out of the holes in the course of assembling, making further assembling work impossible.

The present invention aims at facilitating the assembling of tape reels by minimizing the possibility of a brake release plate coming off from a reel hub with which it has been combined in advance as a subassembly.

SUMMARY OF THE INVENTION

The present invention solves the foregoing problems by providing a reinforcing structure between the center of main plate and legs of a brake release plate in a tape cartridge wherein a single tape reel on which a length of tape is wound is turnably held within a housing consisting of an upper casing and a lower casing, the lower casing having an opening through which a drive shaft of a recorder is to be inserted, the tape reel having a hub which is open at top and is closed at the bottom with a wall, the inner bottom wall of the hub having holes for engagement with a brake release plate, a metal disk is attached to the outer surface of the underside of said hub and teeth are formed on the outer surface around the metal disk for engagement with the drive shaft of a recorder, teeth to engage a brake lock are formed on the inner bottom surface of the hub, a brake release plate is mounted in the hub with legs fitted in the holes of the latter, a brake lock rests on the brake release plate, the brake lock having brake teeth formed on the periphery of the underside to be in mesh with the teeth of the hub and having a follower projection on the upper surface which is adapted to be guided by a guide projection formed in the upper casing so as to be movable upward and downward but not turnable, and a spring member is provided between the brake lock and upper casing to urge the brake lock in the braking position.

Preferably, the reinforcing structure comprises ribs extended, one for each, from the center of main plate to the legs.

Also preferably, a reinforcement is provided in a portion of the center of main plate surrounding the region where the brake release plate contacts the brake lock, said reinforcement being connected to the reinforcements extended to the legs.

The present invention provides a tape cartridge wherein a single tape reel on which a length of tape is wound is turnably held within a housing, the tape reel consisting of an upper flange, a lower flange, and a hub which is open at top and is closed at the bottom, the hub having a metal disk in the center of its outer bottom surface and having teeth formed on the outer bottom around the outer periphery the metal disk for engagement with a drive shaft of a recorder, the bottom of the hub having throughholes for engagement with a brake release plate, the hub having teeth formed on the inner side of the bottom to engage a brake lock, the brake release plate consisting of a main plate disposed between the brake lock and the inner surface of the hub and a plurality of legs adapted to fit in the throughholes in the bottom of the hub, the brake lock having brake teeth formed on the periphery of its underside and a contact area in the center for engagement with the brake release plate, the teeth of the hub and the brake teeth of the brake lock being in mesh to prevent unwanted turning of the tape reel, and a spring member is provided between the brake lock and an upper casing of the housing to urge the brake lock in the braking position, characterized in that each leg of the brake release plate has a short toe formed on its outer end to prevent the leg from coming off, out of engagement with, a corresponding hole of the hub.

The invention also provides a tape cartridge of the foregoing construction characterized in that each throughhole of the hub for engagement with the brake release plate is tapered on the inner side of the hub to facilitate the insertion of the toe of each corresponding leg of the brake release plate, and a small recess capable of accommodating the toe is formed on the outer side of the hub.

According to the invention, the efficiency of cartridge assembling is improved because there is no possibility of a once-incorporated brake release plate coming off from the hub during the course of assembling. Moreover, the brake release plate may be mounted in the hub in advance as a subassembly.

BRIEF DESCRIPTION OF THE DRAWINGS

FIG. 2 shows a hub in perspective, (a) as seen from above and (b) from below;

FIG. 3 shows a brake lock in perspective, (a) as seen from above and (b) from below;

FIG. 4 shows a brake release plate in perspective, (a) as seen from above and (b) from below;

FIG. 5 shows the tape cartridge in cross sections: (a) when the cartridge is not in use (with the brake applied) and (b) when the cartridge is in use (with the brake released), and (c) showing essential parts on an enlarged scale;

FIG. 10 shows in perspective a brake release plate embodying the invention, (a) as seen from below and (b) from above;

FIG. 11 shows a brake release plate embodying the invention as combined with a hub, (a) as a plan view and (b) cross sectional views of the essential parts of (a);

FIG. 12 shows in perspective a modification of the brake release plate according to the invention, (a) as seen from below and (b) from above; and FIG. 13 gives (a) a plan view of a hub combined with the brake release plate of FIG. 12, and (b) an enlarged sectional view of the essential parts of (a).

PREFERRED EMBODIMENTS OF THE INVENTION

Figure 1:
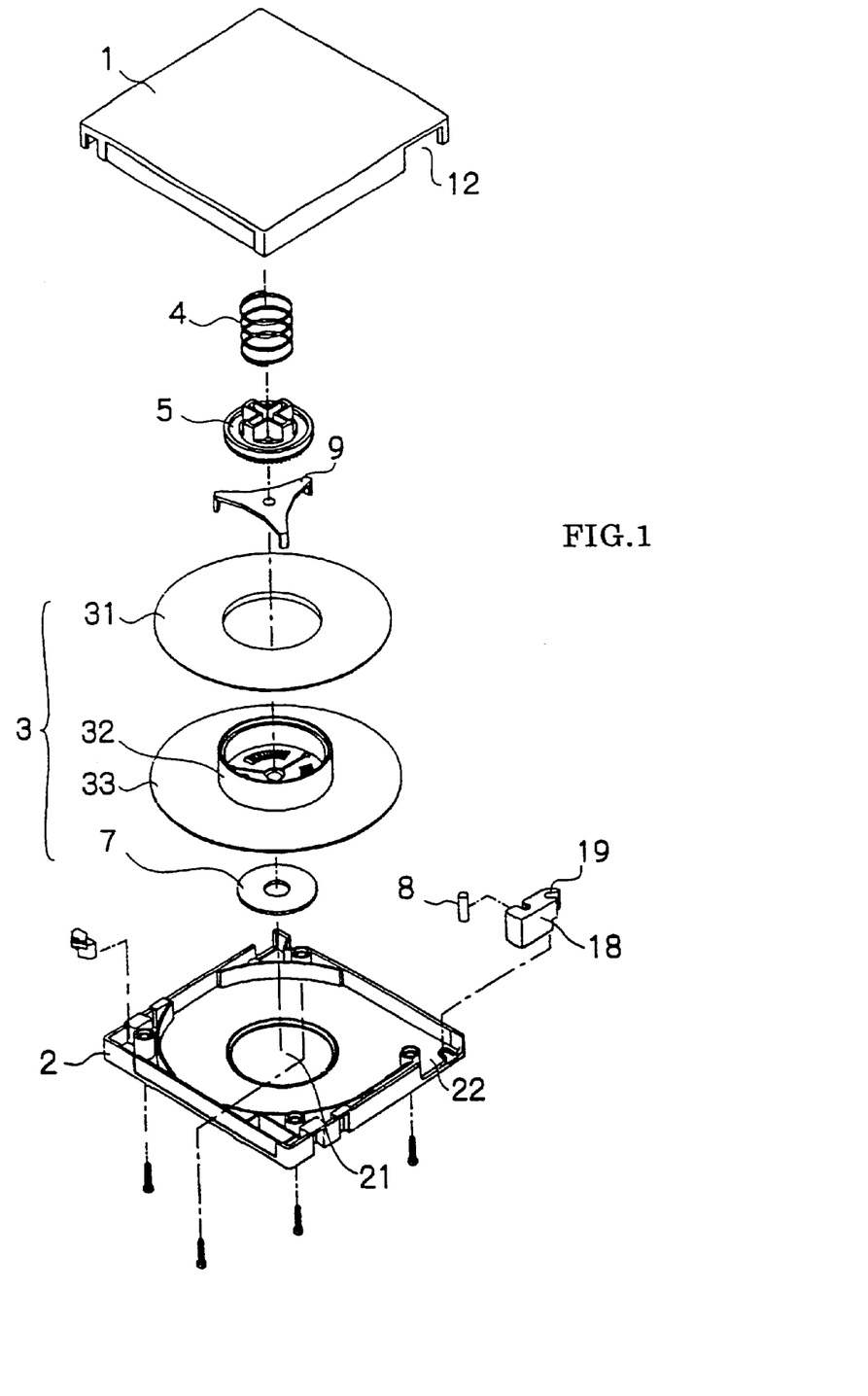
FIG. 1 is an exploded view of a tape cartridge embodying the present invention.

FIG. 1 is an exploded view of a tape cartridge embodying the present invention.

The cartridge comprises a housing consisting of upper and lower casings 1, 2 and a single tape reel 3 on which a length of tape is wound and which is turnably contained in the housing.

Lower casing 2 has an opening 21 through which a drive shaft of a recorder is inserted into the housing. Upper and lower casings 1, 2 have cutouts 12, 22, respectively, which are joined to form an opening through which tape is to be pulled out.

Tape reel 3 consists of an upper flange 31, a hub 32 formed in one piece with a lower flange 33, and a metal disk 7 that fits integrally to the underside of hub 32. Drive teeth 39 are formed on the underside along the periphery of the metal disk 7 and adapted to engage a drive shaft of a recorder. (The metal disk is magnetically attracted by the drive shaft of the recorder to turn tape reel 3.) There is no member to fix the tape in place, because the tape is directly affixed to the outer periphery of the nub with water or the like.

Hub 32 has teeth 35 formed on its inner surface to be in mesh with a brake lock 5 to prevent unwanted turning of tape reel 3 when the latter is not in use.

Brake lock 5 has teeth 51 formed on its underside in mesh with the teeth 35 of hub 32. Brake lock 5 is constantly urged in the braking position by a brake spring 4. Brake lock 5 is positively moved up and down (between the braking position and brake release position) as its follower projection 52 is engaged with positioning means (not shown) provided on the inner surface of upper casing 1.

A brake release plate 9 is interposed between hub 32 and brake lock 5. Brake release plate 9 consists of a main plate 91 and a plurality of legs 92. Legs 92 fit in small throughholes 36 formed in the under surface of hub 32. Once the cartridge is loaded in a recorder, legs 92 of brake release plate 9 are lifted and hence the brake release plate 5 itself is moved upward out of engagement with tape reel 3, setting the reel free to turn.

Figure 2A:
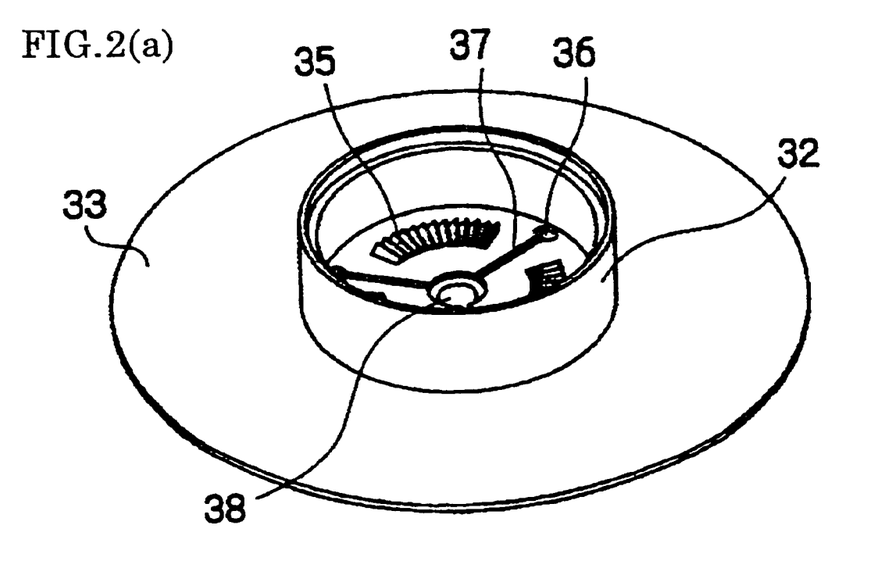
Figure 2B:
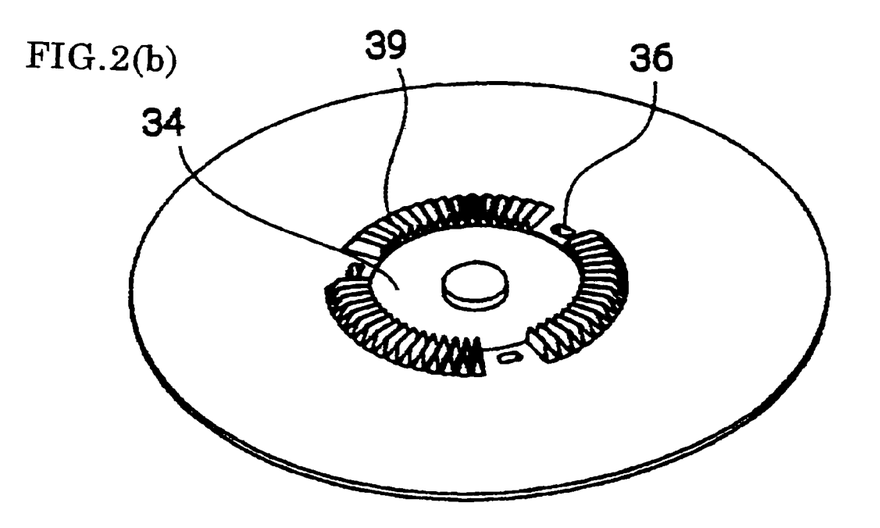

FIG. 2 shows hub 32 in perspective, (a) as seen from above and (b) from below. The lower surface of hub 32 has teeth 35 formed in portions away from throughholes 36, to be in mesh with brake lock 5. In the center of the hub is formed a dent 38, which is connected with the throughholes with radial grooves 37.

On the outer side of the lower surface of hub 32 is formed drive teeth 39 adapted to engage a corresponding part of a recorder, and in the center is formed a recess 34 to engage metal disk 7.

Figure 3A:
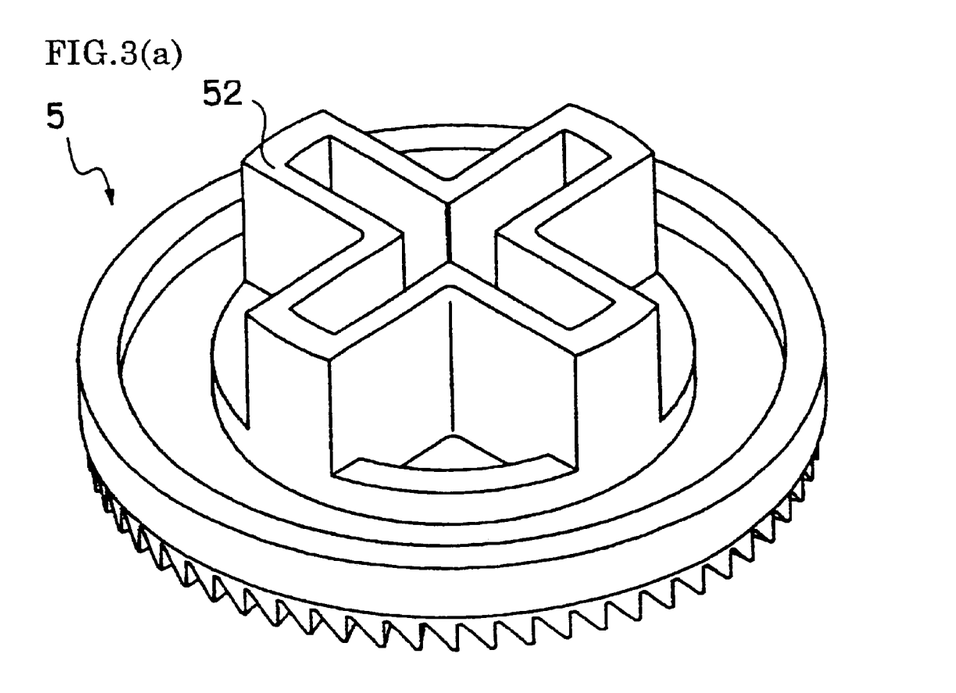
Figure 3B:
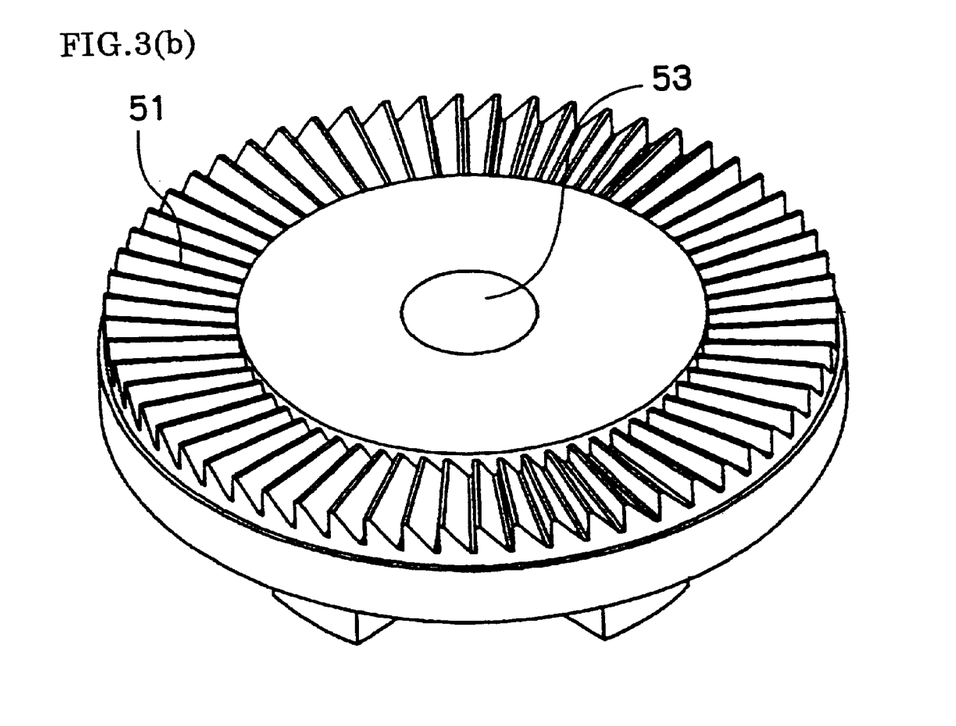

FIG. 3 illustrates brake lock 5 in perspective, (a) as seen from above and (b) from below. Brake lock 5 has brake teeth 51 formed on the underside and adapted to engage teeth 35 of hub 32 so as to prevent unwanted turning of tape reel 3 and also has a lug 53 formed in the center which comes in contact with a brake release plate 9.

Figure 4A:
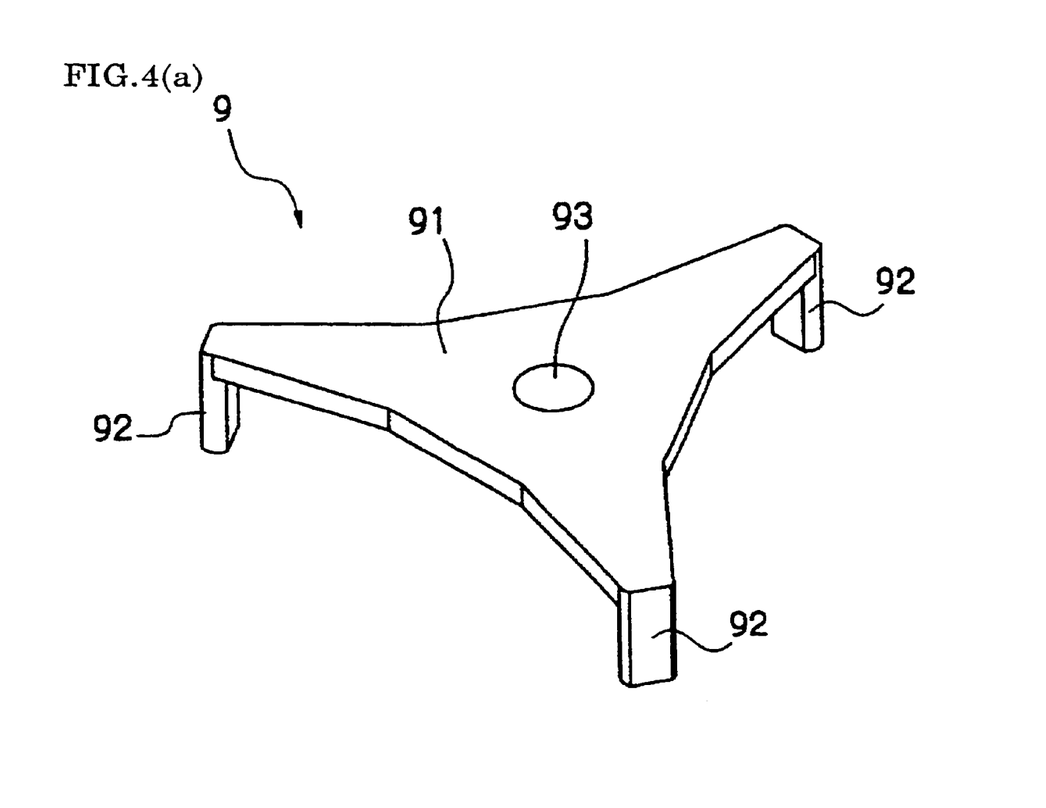
Figure 4B:
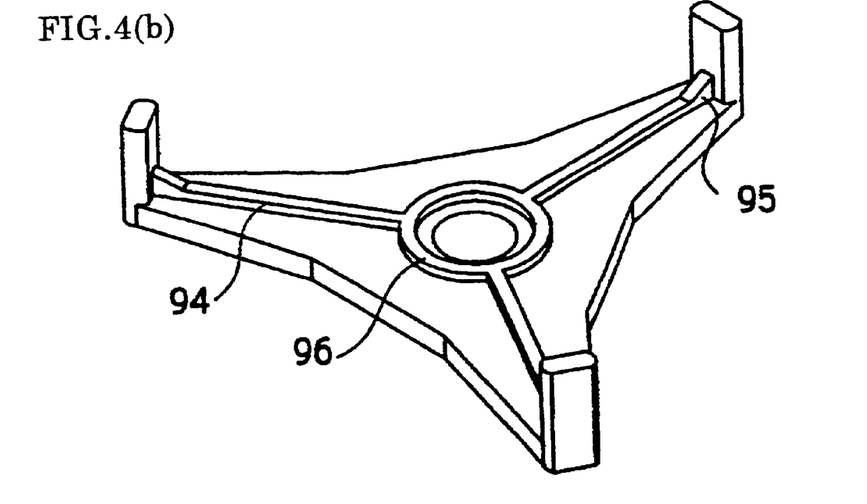

FIG. 4 shows brake release plate 9 in perspective, (a) as seen from above and (b) from below. Brake release plate 9 consists of three legs 92 and a generally triangular main plate 91. A dent 93 is formed in the center of main plate 91. Dent 93 is located where it comes in contact with lug 53 of brake lock 5, and its concavity prevents off-center alignment of the two parts and ensures smooth turning of the reel. On the underside of brake release plate 9 there are formed first reinforcing ribs 94 between its center and legs 92.

Figure 5A:
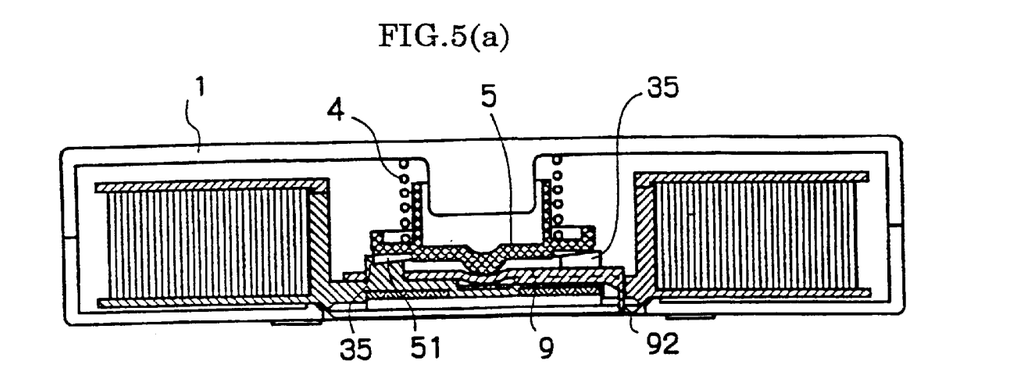
Figure 5B:
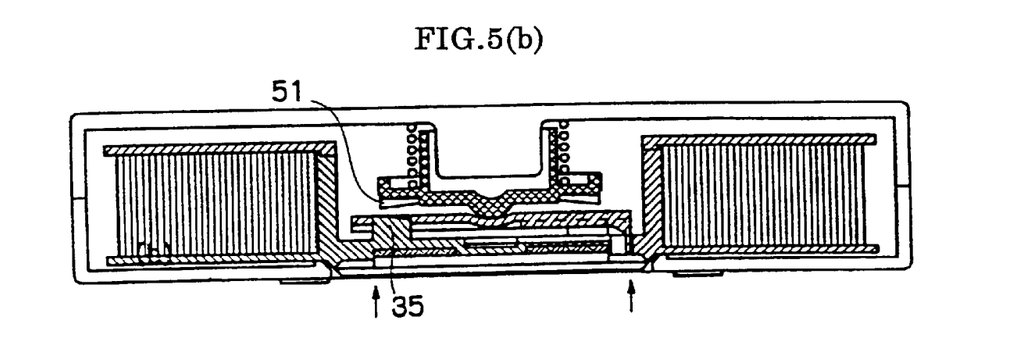
Figure 5C:
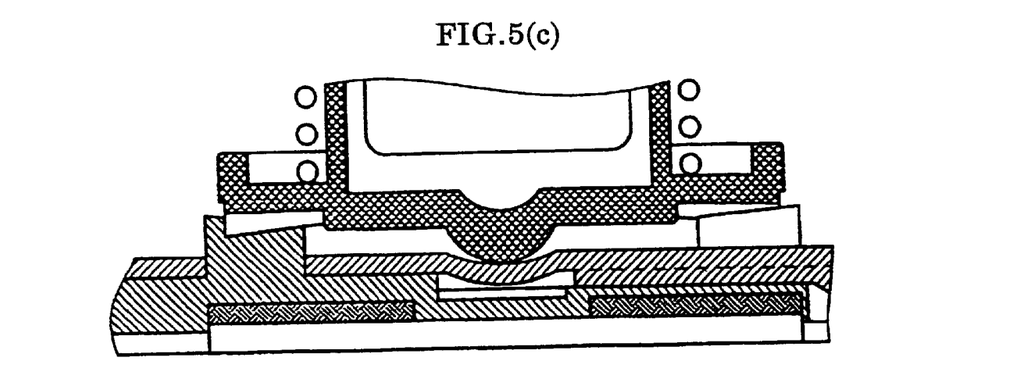

FIG. 5 gives sectional views of the cartridge, (a) when the brake is applied, (b) when the brake is released, and (c) showing essential parts on an enlarged scale. Brake release plate 9 is constantly urged downward from above by brake lock 5. When the cartridge is used, legs 92 are forced upward against the downward urging, by a brake release member (not shown) of a recorder, with consequent upward movement of brake release plate 9 and application of reversely directed forces to the center and legs 92 on the outer edges of brake release plate 9. For this reason first reinforcing ribs 94 are provided to add strength to brake release plate 9.

Also, because reinforcing ribs 94 fit in grooves 37 of hub 32, the position of brake lock 5 in the height direction remains unchanged. Increasing the thickness of the brake release plate as a whole is not desirable. For one thing, the reinforcing effect is enhanced but the material cost rises too. For the other, the lower part of the hub must be thin walled throughout at a sacrifice of the hub strength. An additional reinforcing effect is obtained by providing reinforcing ribs 95 of greater height and strength than reinforcing ribs 94 at joints between legs 92 and main plate 91. The additional ribs preclude the possibility of warping or bending of the joints. Further, reinforcing ribs 94 may be connected in the center to form an annular rib 96 in a location where it does not interfere with the contacting action of brake lock 5.

While the joints between main plate 91 and legs 92 in the illustrated embodiment are reinforced with ribs 94 to 96, the ribs may be formed by drawing when brake release plate 9 is made of metal. It is also possible to adopt a reinforcing structure consisting of a number of projections instead of the continuous ribs.

A reinforcing structure is provided at connections between the center of main plate and the legs of a brake release plate, whereby unwanted deformation of the brake release plate is prevented and positive brake release action is made possible.

Figure 8:
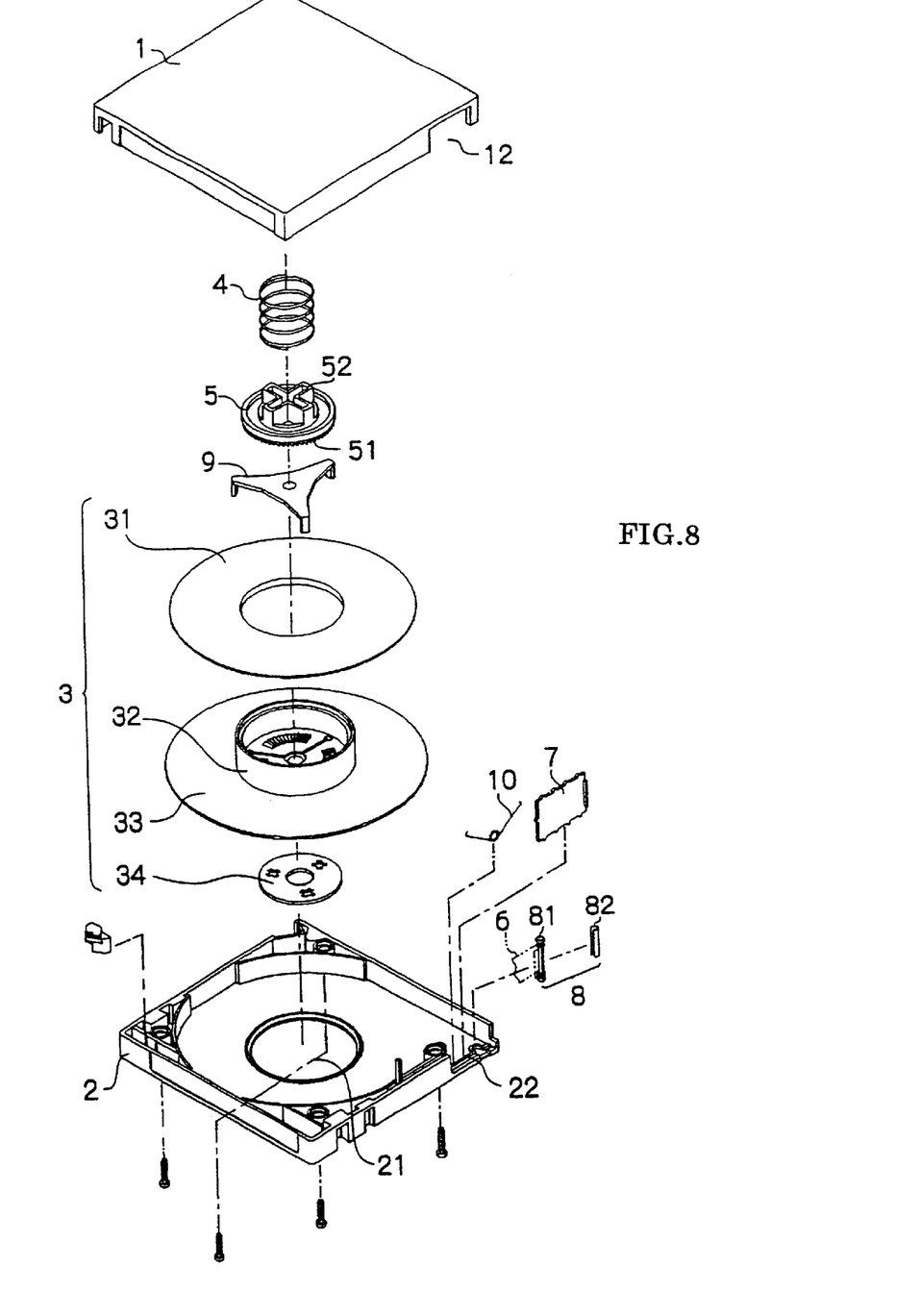
FIG. 8 is an exploded view of a tape cartridge embodying the present invention.

FIG. 8 is an exploded view of another embodiment of the tape cartridge of the invention.

The cartridge comprises a housing consisting of upper and lower casings 1, 2 and a single tape reel 3 on which a length of tape is wound and which is turnably contained in the housing.

Lower casing 2 has an opening 21 through which a drive shaft of a recorder is inserted into the housing. Upper and lower casings 1, 2 have cutouts 12, 22, respectively, which are joined to form an opening through which tape is to be pulled out.

Tape reel 3 consists of an upper flange 31, a reel hub 32 formed in one piece with a lower flange 33, and a metal disk 34 integrally fixed to the underside of reel hub 32. Teeth 39 are formed along the periphery of the metal disk 34 and adapted to engage a drive shaft of a recorder. Metal disk 34 is made of magnetic metal and is magnetically attracted by magnetic means of the drive shaft of the recorder to turn tape reel 3. There is no member to fix the tape 6 in place, because the tape is directly affixed to the outer periphery of the hub with water or the like.

Reel hub 32 has teeth 35 formed on its inner surface to be in mesh with a brake lock 5 to prevent unwanted turning of tape reel 3 when the latter is not in use.

Brake lock 5 has teeth 51 formed on its underside in mesh with the teeth 35 of reel hub 32. Brake lock 5 is constantly urged in the braking position by a reel spring 4. Brake lock 5 is positively moved up and down between the braking position and brake release position as its follower projection 52 is engaged with positioning means (not shown) provided on the inner surface of upper casing 1.

A brake release plate 9 is interposed between reel hub 32 and brake lock 5.

Brake release plate 9 consists of a main plate 91 and a plurality of legs 92. Legs 92 fit in small throughholes 36 formed in the underside (bottom wall) of reel hub 32. Once the cartridge is loaded in a recorder, legs 92 of brake release plate 9 are lifted and hence the brake release plate 5 itself is moved upward out of engagement with tape reel 3, setting the reel free to turn.

The beginning of tape 6 is fixed to a leader 8. Leader 8 consists of a pin member 81 and a C-shaped clamp 82. The tape end is wound round pin member 81 and is set in place as C-shaped clamp 82 is fitted over it. When the cartridge is loaded in a recorder, leader 8 is held by a holder of the recorder and tape 6 is pulled out.

The cartridge opening through which tape is drawn out is opened or closed by a door member 7. Door member 7 is constantly urged by a spring 10 toward the closing direction.

Figure 9:
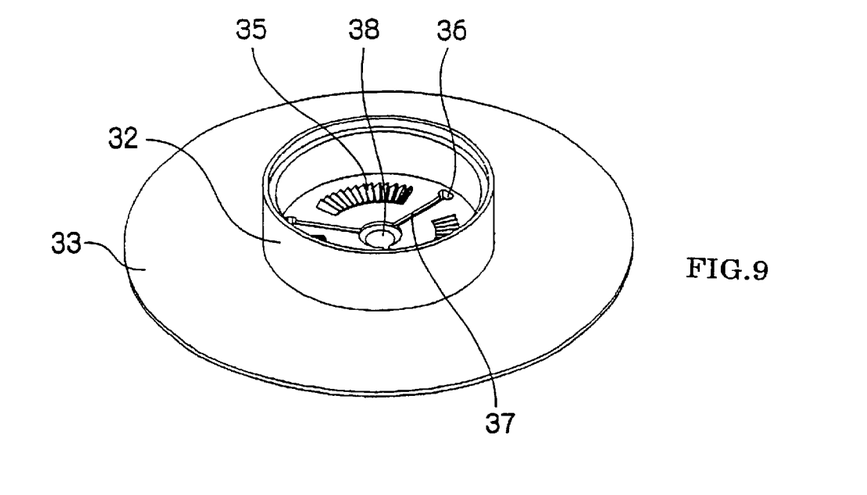
FIG. 9 is a perspective view of a hub embodying the invention.
Figure 10A:
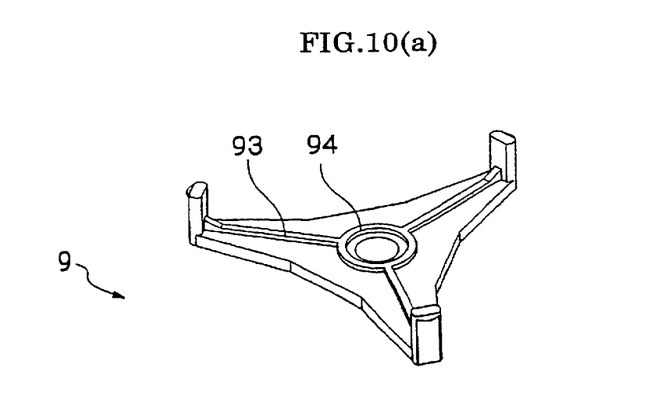
Figure 10B:
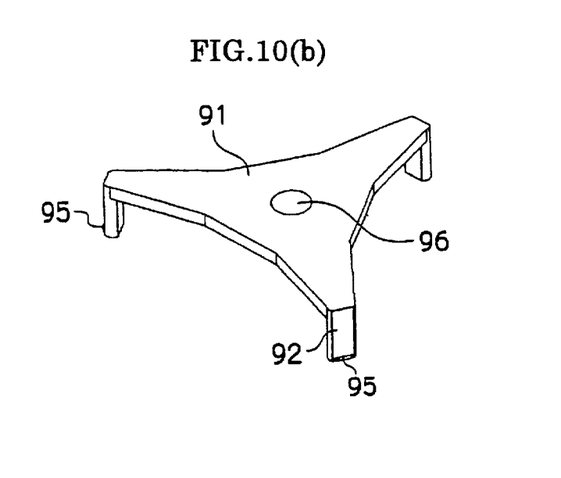

FIG. 9 is a perspective view of reel hub 32. The lower surface of reel hub 32 has teeth 35 formed in portions away from throughholes 36, to be in mesh with brake lock 5. In the center of the hub is formed a dent 38, which is connected with the throughholes with radial grooves 37.

Figures 11, 11B:
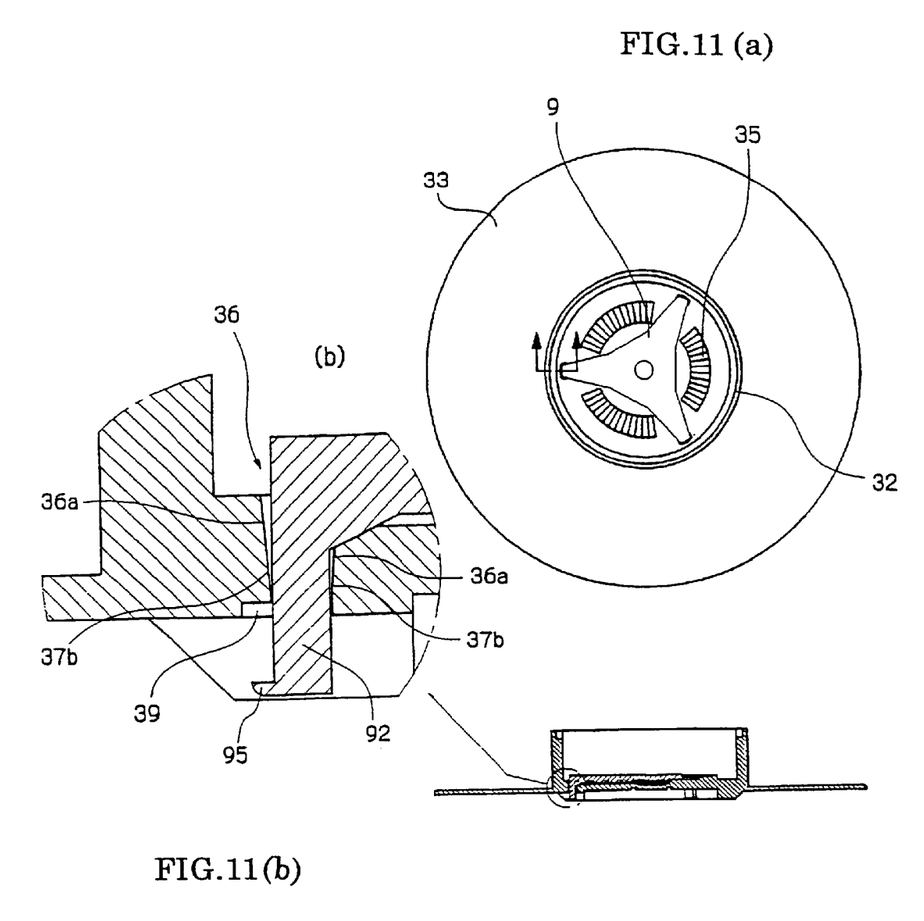

FIG. 11 illustrates brake release plate 9 in perspective, (a) as seen from below and (b) from above. Brake release plate 9 consists of a main plate 91 and three legs 92. Ribs 93, 94 are formed on the back side of main plate 91, in portions facing a center recess 28 and grooves 37 of reel hub 32. These ribs 93, 94 are intended for the reinforcement of brake release plate 9. Each leg 92 has a short toe 95 formed on the outer end. These toes 95 prevent the legs from coming off throughholes 36. As indicated in FIG. 11(b), there is an area 96 marked out for contact with brake lock 5. The contact area 96 may take the form of a gently curved lug or dent, which can act on a corresponding dent or lug formed on the underside of brake lock 5 for center alignment.

Figure 12A:
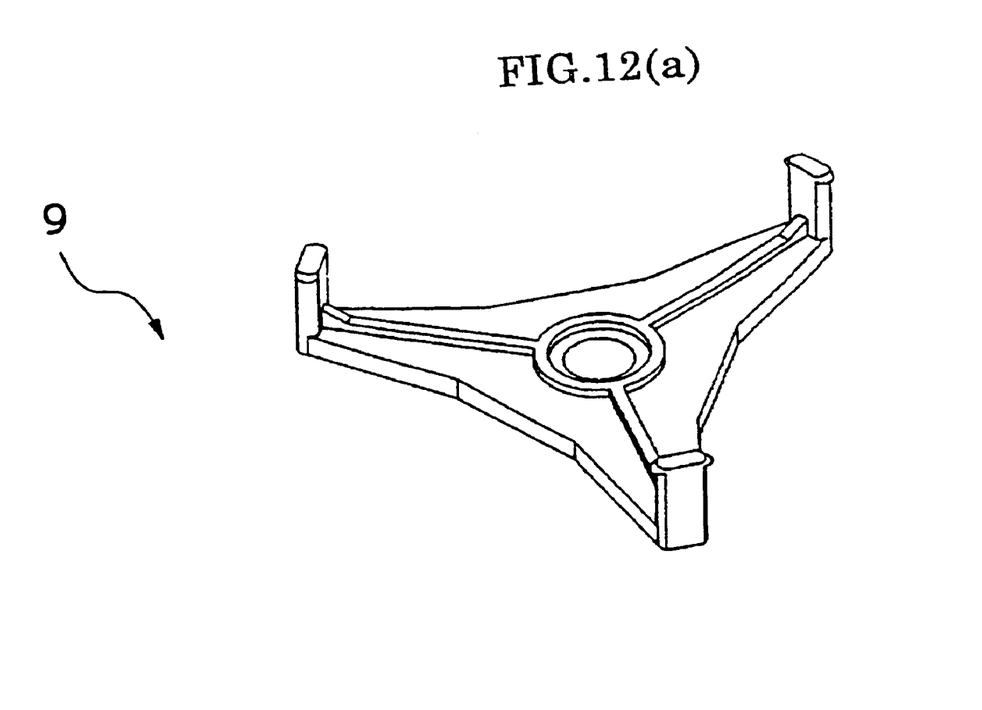
Figure 12B:
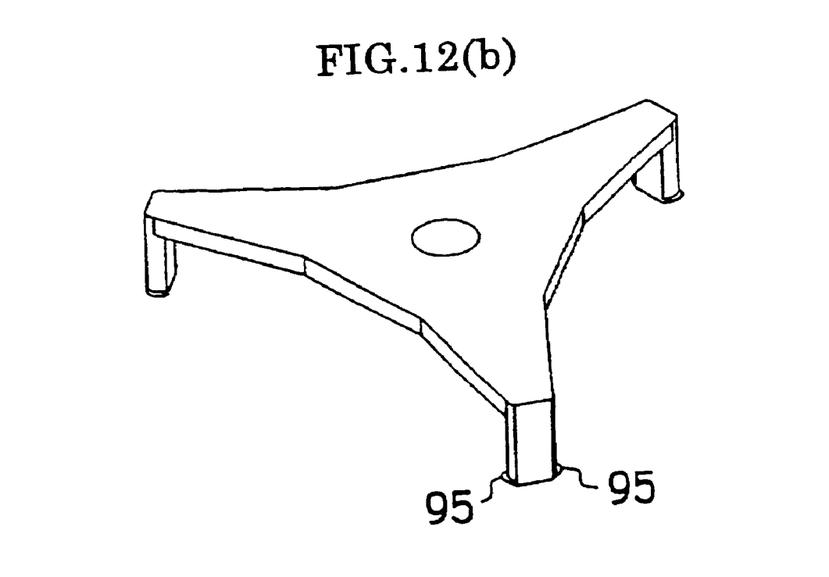

In FIG. 12, (a) is a plan view of reel hub 32 combined with brake release plate 9 and (b) is a fragmentary sectional view of essential parts. The upper portion of each throughhole 36 of reel hub 32 is tapered as at 36a to facilitate the insertion of the toe 95 of each leg of brake release plate 9. On the back side of reel hub are formed small recesses 39 capable of accommodating toes 95 when brake release plate 9 is lifted at the time the tape cartridge is used. For proper positioning of each leg 92 a vertical wall portion 37b is formed between each tapered portion 36a and recess 39.

With the construction described, brake release plate 9 is combined with reel hub 32 in the following way. As legs 92 are forced into throughholes 36, their toes 95 elastically slide past vertical wall portions 37b and fit in recesses 39, precluding any possibility of the brake release plate coming off the reel hub. Thanks to recesses 39 formed to receive them, toes 95 provide no obstacle inside a recorder.

Figure 13A:
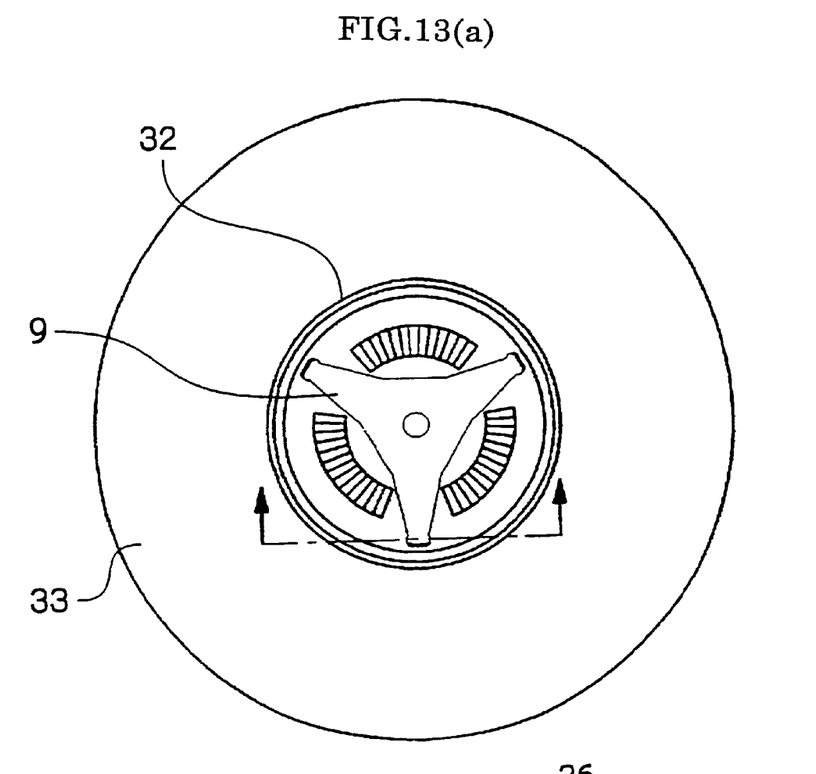
Figure 13B:
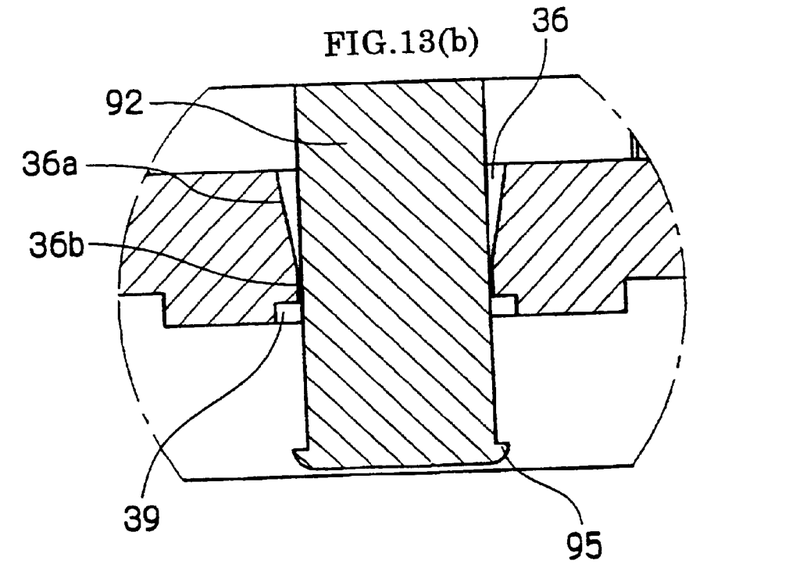

FIGS. 12 (*a*), (*b*) and FIG. 13 (*a*), (*b*) illustrate a modified form of the above embodiment. A pair of toes 95 are formed on both sides of each leg 92. Here again each throughhole 36 consists of a tapered portion 36*a*, vertical wall portion 36*b*, and small recesses 39. Thus toes 95 may be formed at any desired points of the leg end, and many other modifications and variations may be made within the spirit and scope of the invention.

According to the present invention, the efficiency of cartridge assembling is improved because there is no possibility of the brake release plate coming off from the hub during the course of assembling. The brake release plate may be mounted in the hub in advance to handle the two as an integral subassembly. This facilitates the cartridge assembling work.

What we claim is:

1. A tape cartridge wherein a single tape reel on which a length of tape is wound is turnably held within a housing comprising an upper casing and a lower casing, the lower casing having an opening through which a drive shaft of a recorder is to be inserted, said tape reel having a hub which is open at a top thereof and is closed at the bottom with a bottom wall, the bottom wall of said hub having holes for engagement with a brake release plate including a main plate and legs, teeth formed on the outer surface of the underside of said hub for engagement with a metal disk and the drive shaft of a recorder, teeth to engage a brake lock formed on an inner surface of the bottom wall of said hub, the brake release plate being mounted in said hub with the legs fitted in the holes of the bottom wall, a brake lock resting on said brake release plate, said brake lock having brake teeth formed on the periphery of the underside to mesh with the teeth of said hub and having a follower projection on the upper surface which is adapted to be guided by a guide projection formed in the upper casing so as to be movable upwardly and downwardly but not turnable, and a spring member provided between said brake lock and upper casing to urge said brake lock in the braking position, wherein a first reinforcing structure is provided between a center area of the main plate and the legs of the brake release plate, the reinforcing structure comprising ribs extended, one for each, from a center area of the main plate to the legs.

2. The tape cartridge of claim 1, wherein a second reinforcing structure in the form of an annular rib is provided in the center area of the main plate, said annular rib being connected to the ribs extended from the center of the main plate to the legs.

3. A tape cartridge, wherein a single tape reel on which a length of tape is wound is turnably held within a housing, said tape reel comprising of an upper flange, a lower flange, and a hub which is open at a top thereof and is closed at a bottom thereof, the bottom of said hub having throughholes for engagement with a brake release plate, said hub having teeth formed on the inner side of the bottom to engage a brake lock, said brake release plate comprising a main plate disposed between said brake lock and the inner surface of said hub and a plurality of legs adapted to fit in said throughholes in the bottom of said hub, said brake lock having brake teeth formed on the periphery of the underside thereof and a contact area in the center for engagement with said brake release plate, said teeth of said hub and said brake teeth of said brake lock being in mesh to prevent unwanted turning of said tape reel, and a spring member provided between said brake lock and an upper casing of the housing to urge said brake lock in the braking position wherein each said brake release plate has a short toe formed on an outer end thereof to prevent the leg from coming out of engagement with a corresponding hole of said hub, and each throughhole of said hub for engagement with said brake release plate is tapered on an inner side of said hub to facilitate the insertion of the toe of each corresponding leg of said brake release plate, and a small recess capable of accommodating said toe is formed on an outer side of said hub.

4. A tape cartridge, wherein a single tape reel on which a length of tape is wound is turnably held within a housing comprising an upper casing and a lower casing, the lower casing having an opening through which a drive shaft of a recorder is to be inserted, said tape reel having a hub which is open at a top thereof and is closed at a bottom thereof with a bottom wall, the bottom wall of said hub having holes for engagement with a brake release plate including a main plate and legs, teeth formed on the outer surface of the underside of said hub for engagement with a metal disk and the drive shaft of a recorder, teeth to engage a brake lock formed on an inner surface of the bottom wall of said hub, the brake release plate being mounted in said hub with the legs fitted in the holes of the bottom wall, a brake lock resting on said brake release plate, said brake lock having brake teeth formed on the periphery of the underside to mesh with the teeth of said hub and having a follower projection on the upper surface which is adapted to be guided by a guide projection formed in the upper casing so as to be movable upwardly and downwardly but not turnable, and a spring member provided between said brake lock and upper casing to urge said brake lock in the braking position, wherein a first reinforcing structure is provided between a center area of the main plate and the legs of the brake release plate, and a second reinforcing structure in the form of an annular rib is provided in the center area of the main plate, said annular rib being connected to the first reinforcing structure extended from the center of the main plate to tile legs.

* * * * *

UNITED STATES PATENT AND TRADEMARK OFFICE
CERTIFICATE OF CORRECTION

PATENT NO. : 6,411,466 B1
DATED : June 25, 2002
INVENTOR(S) : Motohiko Shima et al.

It is certified that error appears in the above-identified patent and that said Letters Patent is hereby corrected as shown below:

<u>Column 8,</u>
Line 51, please change "tile" to -- the --.

Signed and Sealed this

Twenty-sixth Day of November, 2002

Attest:

Attesting Officer

JAMES E. ROGAN
*Director of the United States Patent and Trademark Office*